US006847762B2

(12) United States Patent
Sweetser et al.

(10) Patent No.: US 6,847,762 B2
(45) Date of Patent: Jan. 25, 2005

(54) MONITORING AND CORRECTING BRAGG GRATINGS DURING THEIR FABRICATION

(75) Inventors: John N. Sweetser, San Jose, CA (US); Anders Grunnet-Jepsen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 10/188,557

(22) Filed: Jul. 2, 2002

(65) Prior Publication Data

US 2004/0005116 A1 Jan. 8, 2004

(51) Int. Cl.$^7$ .............................. G02B 6/34; H01L 21/00
(52) U.S. Cl. ........................... 385/37; 385/11; 385/123; 438/32
(58) Field of Search .......................... 385/31, 37, 123, 385/11, 129, 24; 438/32

(56) References Cited

U.S. PATENT DOCUMENTS

| | | | |
|---|---|---|---|
| 6,310,996 B1 * | 10/2001 | Byron | 385/37 |
| 6,384,977 B1 * | 5/2002 | Laming et al. | 359/570 |
| 6,404,956 B1 * | 6/2002 | Brennan et al. | 385/37 |
| 6,483,965 B1 * | 11/2002 | Napier et al. | 385/37 |
| 6,753,118 B2 * | 6/2004 | Deshmukh et al. | 430/30 |
| 2003/0186142 A1 | 10/2003 | Deshmukh et al. | 385/37 X |
| 2004/0005116 A1 * | 1/2004 | Sweetser et al. | 385/37 |

FOREIGN PATENT DOCUMENTS

SU 1327037 A1 7/1987 ............... 385/37 X

OTHER PUBLICATIONS

A. Buryak et al., *Correction of Systematic Errors in the Fabrication of Fiber Bragg Gratings*, Optical Letters, Optical Society of America, Washington, vol. 27, No. 13, Jul. 1, 2002, pp. 1099–1101.

D. Sandel et al., *Chirped Fiber Bragg Gratings for Optical Dispersion Compensation: How to Improve Their Fabrication Accuracy*, ECOC 96, Oslo, vol. 2, Sept. 15, 1996.

D. Sandel et al., *Longitudinal Structure Characterization of Fiber Bragg Gratings by Optical Network Analysis*, SPIE Proceedings Selected Papers From Photonics, India 98, vol. 3666, Dec. 1998, pp. 84–93.

* cited by examiner

Primary Examiner—Brian M. Healy
(74) Attorney, Agent, or Firm—Trop, Pruner & Hu, P.C.

(57) ABSTRACT

In accordance with some embodiments of the present invention, while a Bragg grating is being written in a substrate, measurements may be taken to allow changes to be made in the writing process to reduce errors that may occur in the written grating. In one embodiment, multiple scans of the writing beam can be used. After a scan, measurements of the characteristics of the grating being written can be taken and corrections may be implemented on subsequent scans.

54 Claims, 4 Drawing Sheets

MONITORING AND CORRECTING BRAGG GRATINGS DURING THEIR FABRICATION

BACKGROUND

This invention relates to the process of correcting for phase errors during the fabrication of Bragg gratings.

Bragg gratings in optical waveguides (fiber and planar) are used for a variety of optical processing functions. The most common application is simple wavelength filtering in dense wavelength-division multiplexing (DWDM) systems.

In such applications, the ideal Bragg grating filter has a spectral response that is rectangular in shape, with sharp edges and a flat top. In general, any phase or amplitude errors in the fabrication process lead to a non-ideal spectral response.

Moreover, as the DWDM channel spacing becomes smaller, the filter bandwidth must also be reduced by the same amount. The reduced bandwidth requires the Bragg grating lengths to increase. These requirements lead to a significantly increased sensitivity in the spectral quality of the filter to any errors in the fabrication process. One common source of such errors is the imperfection of the phase masks used in the fabrication process.

More generally, any filter response will be negatively affected by the presence of errors in the fabrication process. In general, the longer the grating, the more sensitive it will be to errors.

A process that can eliminate or reduce the effect of these errors is desirable and will become more valuable as more complex optical processing functionality is required.

DETAILED DESCRIPTION

Figure 1:
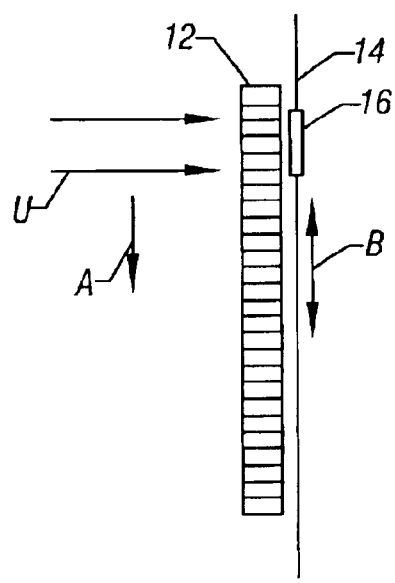
FIG. 1 is a schematic depiction of one embodiment of the present invention.

In accordance with one embodiment shown in FIG. 1, a phase correction process involves shifting the interference pattern that illuminates a waveguide 14 as the ultraviolet writing beam U is scanned along the waveguide 14. The ultraviolet writing beam U exposes a phase mask 12. In one embodiment, the ultraviolet writing beam U may be scanned along the length of the mask 12 as indicated by the arrow A. At the position of the writing beam U shown in FIG. 1, a grating 16 is formed in a waveguide 14. The waveguide 14 may be fiber or may be a planar waveguide, as two examples.

The phase correction process may achieve the proper shift of the interference pattern by making small adjustments, indicated by the arrows B, to the relative position, with respect to the waveguide 14, of one or more of the phase gratings (e.g., masks) 12 used to generate the interference pattern as the writing beam U is scanned along the waveguide 14. The magnitude and direction of the shift is directly related to the error function that is to be corrected.

Typical phase errors in the phase masks 12 used in waveguide Bragg grating production are on the order of several radians across the length of the grating 16. This translates into shifting the interference pattern by a few microns over the length of the grating 16 in order to compensate for these errors.

The resolution with which the phase errors can be reduced is limited by both the position resolution of the stage used for shifting the interference pattern and the size of the beam U used for writing the Bragg grating 16. The better the stage resolution and the smaller the writing beam U, the more precisely one can control the phase of the correction process. Typically, nanometer resolution and control are used for the positioning of the waveguide 14 with respect to the phase mask 12.

Figure 2:
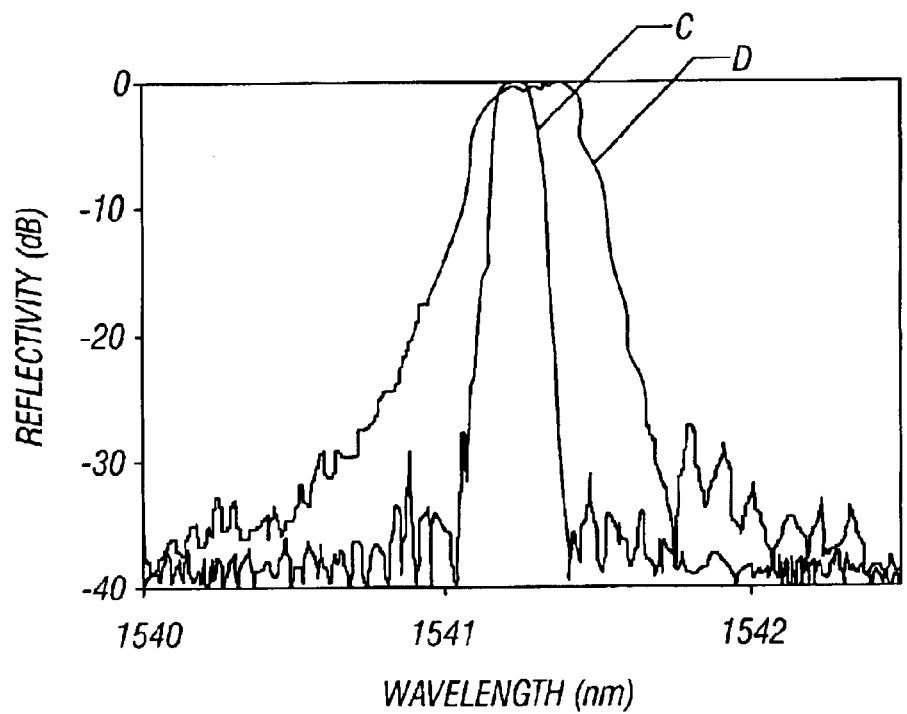
FIG. 2 is a graph showing the results with one embodiment of the present invention indicated at C and the results with a typical prior art embodiment indicated at D.
Figure 3:
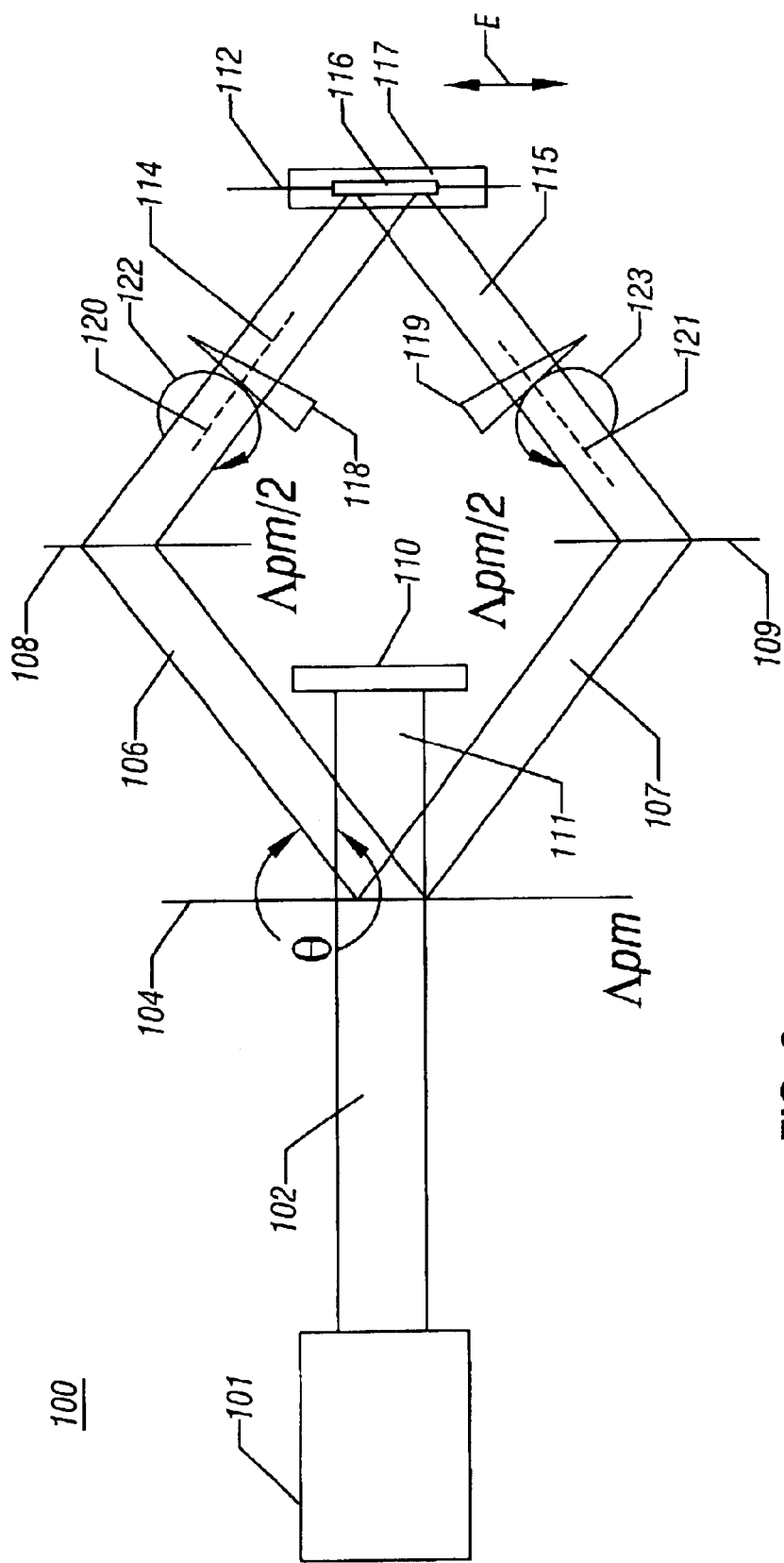
FIG. 3 is a schematic depiction of another embodiment of the present invention.

Referring to FIG. 2, a graph of reflectivity versus wavelength for a grating, in accordance with the prior art, is indicated at D and for grating 116, in accordance with one embodiment of the present invention, is indicated at C. By correcting phase mask error, a higher quality grating can be produced with a narrower spectrum, as indicated C in FIG. 2, in accordance with some embodiments of the present invention. In addition to the correction of errors associated with phase masks and translation stages used in the fabrication of Bragg gratings using standard phase mask methods, phase correction according to embodiments of the present invention may also be utilized in more advanced methods. For example, in a three-grating interferometric technique for Bragg grating fabrication, the Bragg grating wavelength may be tuned without changing any of the phase masks by any one of several means. One such method involves placing prisms or wedges 118, 119 in each arm of the interferometer 100 as shown in FIG. 3. Rotation of the prisms or wedges 118, 119 leads to a change in the period of the interference pattern and thus a corresponding change in the Bragg grating 116 wavelength.

The apparatus 100 includes a laser 101 (or other light source) that produces a laser beam 102 that is incident to a first diffraction grating 104 having a period Λ. Diffraction orders 106, 107 (the +1 and −1 diffraction orders, respectively) are produced and directed to respective gratings 108, 109 that have grating periods of about Λ/2. The gratings 108, 109 may have grating periods ranging from about 80%–120% of Λ/2 in some embodiments. An undiffracted component 111 of the beam 102 is blocked by a baffle 110.

A diffraction order 114 (a−1 order) produced by the grating 108 and a diffraction order 115 (a+1 order) produced by the grating 109 are directed to circular, rotatable wedges or prisms 118 and 119. In one embodiment, the wedges 118 and 119 are arranged so that their bisector is normal to the direction of propagation of light from a grating 108, 109 to a waveguide 112. The intersecting angle of the two orders 114, 115 (at the interference pattern 116) and, thus, the spatial frequency, of a Bragg grating being written in a waveguide 112 is modified by rotating the wedges or prisms 118 and 119 in opposite directions indicated by the arrows 121, 122 along an axis that is parallel to the propagation direction of the light.

This process introduces a small amount of translation in the position of the beam intersection which may be compensated by translation of the waveguide 112 as indicated by the arrows E. For this purpose, the optical system 10 or the waveguide 112 may be mounted on a translation stage 117.

In some implementations of this technique, a phase shift accumulates as the grating 116 is written which can distort the grating spectrum. Generally, the phase shift is linear with position along the grating 116 and the slope of phase shift versus position increases as the interferometer 100 is tuned away from its natural wavelength (determined by the phase masks). This type of phase error may be compensated using the process described above for phase mask error correction. Because of the flexibility of the three-grating interferometer, it is possible to employ other methods to achieve phase correction in addition to, or instead of, the process described above. For example, because the wedges modify the phase of the light that passes through them, it is possible to shift the phase of the exposure fringe pattern, and thus the phase of the Bragg grating, by appropriately rotating the two wedges. In this case, the wedges should be rotated in the same direction as opposed to the opposite direction as required for tuning the frequency of the Bragg grating, as described above. The degree and direction of the rotation depends on the specific phase error profile that is being corrected. Another method for implementing phase correction in the three-grating interferometer involves placing optical phase modulators in one or both arms of the interferometer. These devices serve to modify, in a prescribed manner, the optical phase of the light passing through them. Therefore, by applying the appropriate control signals to the phase modulators, one may shift the Bragg grating phase in such a way to correct for a known phase error profile. Other sources of phase errors associated with optical and/or mechanical components or procedures used in the fabrication of Bragg gratings, once quantified, may be eliminated or reduced using embodiments of the present invention.

Even if the source of a phase error is not known a priori, it is still possible to use the methods of the type described herein to correct or compensate for these errors. In such cases when the specific phase error function is not known prior to the fabrication of the grating, one may use other means to determine or estimate this quantity. One such method involves performing various measurements on the Bragg grating, either during fabrication or after the grating has been written. Determination of the appropriate optical properties of the Bragg grating can yield information about the phase profile of the grating and thus may permit reconstruction of the phase error function present during exposure of the grating.

There are a variety of methods that can be used to determine the phase function, and thus the phase error, of a Bragg grating. Generally, optical phase is not a directly detectable quantity. Therefore, the methods for the determination of optical phase rely on indirect means that can be generally labeled coherent (or phase-sensitive) and incoherent. Coherent methods are typically more accurate and more direct since they are sensitive to the phase of the signal being measured (although they do not directly measure the phase). However, they are generally difficult to implement mainly because they involve interferometric measurements, which can be extremely sensitive to environmental effects. Two such examples of coherent phase measurements that may be used to determine the phase function of a Bragg grating are spectral interferometry and Fourier Transform spectrometry. Both methods have been applied to a wide variety of optical measurements and are known in the art.

Incoherent methods are generally less accurate and less direct, but they are much easier to implement since they involve easily measurable quantities, such as spectral intensity and temporal response of the device. However, since neither of these quantities uniquely depends on the optical phase, it is more difficult to determine the phase from them. Thus, in order to obtain the phase from incoherent methods, a phase extraction process may be used. The details of the phase extraction process depend on the types of data about the device that are available. In general, the more data that is available, the simpler the phase extraction process and the more accurate the result. Ideally, both the spectral and temporal response of the device is available. In this case, it is possible to use phase retrieval algorithms in order to extract the phase of the device. The specific algorithm for phase retrieval for Bragg gratings is a modified version of similar algorithms that are known in the art. In cases where only spectral or temporal responses are known, one may use other information about the grating in order to obtain the phase. A method that is well suited for Bragg gratings is one where only the spectral response is measured, using for example a tunable laser source and a photodetector to measure the reflected power from the grating versus wavelength. The spectral response by itself may not be sufficient to determine the phase function of the grating; however, because the fabrication of the grating involves scanning the exposure beam along the length of the phase mask or masks, one may measure the spectral response for different length gratings. One may use the set of spectral responses for different lengths in conjunction with a phase extraction process to obtain an estimate of the phase function of the grating. This method is not exact, however it is easy to implement and requires a minimum of additional measurements to be made in order to obtain an approximate phase function for the grating.

Depending on the method used to determine the phase function, it may be defined in any one of several ways, e.g., phase versus wavelength, phase versus time, or phase versus position along the grating. Since the phase correction process inherently works in the space domain, one may use the phase versus position in order to determine the phase error function. If, however, the phase extraction process yields a different phase function, it is still possible to convert it to the desired phase versus position function using techniques known in the art.

Once the phase versus position of the grating is determined, by any of the methods described herein or any other method, then the phase error function is obtained by simply comparing the measured phase function with the specific spatial phase function that was designed for the grating. In many cases, the desired phase function is a linear function across the grating (a so-called "transform-limited" grating), in which case, the phase variation determined from the phase extraction process is equal to the phase error function. Note that the linear component of the phase function is generally not relevant for phase correction and thus may be removed. In general, however, the designed phase function may be arbitrary. For example, for dispersion compensating gratings, the designed phase function may be quadratic versus position. Whatever the form of the designed phase function, the phase error function is obtained by subtracting the extracted phase function from the designed phase function. The result is the phase error function that is used in the correction process.

The correction process proceeds as described earlier using the phase error function, either directly measured (or known a priori using other means), or extracted from measurements on the grating itself as described above. Specifically, a phase correction is applied to the grating, as it is written, that is equal and opposite to the phase error. The effect of the phase correction is to remove or compensate the phase errors present in the fabrication process. Therefore, for a transform-limited grating, only the phase correction function is applied. For gratings with more complex designed phase profiles, the designed phase function must be added to the phase correction function before being applied to the grating.

Figure 4:
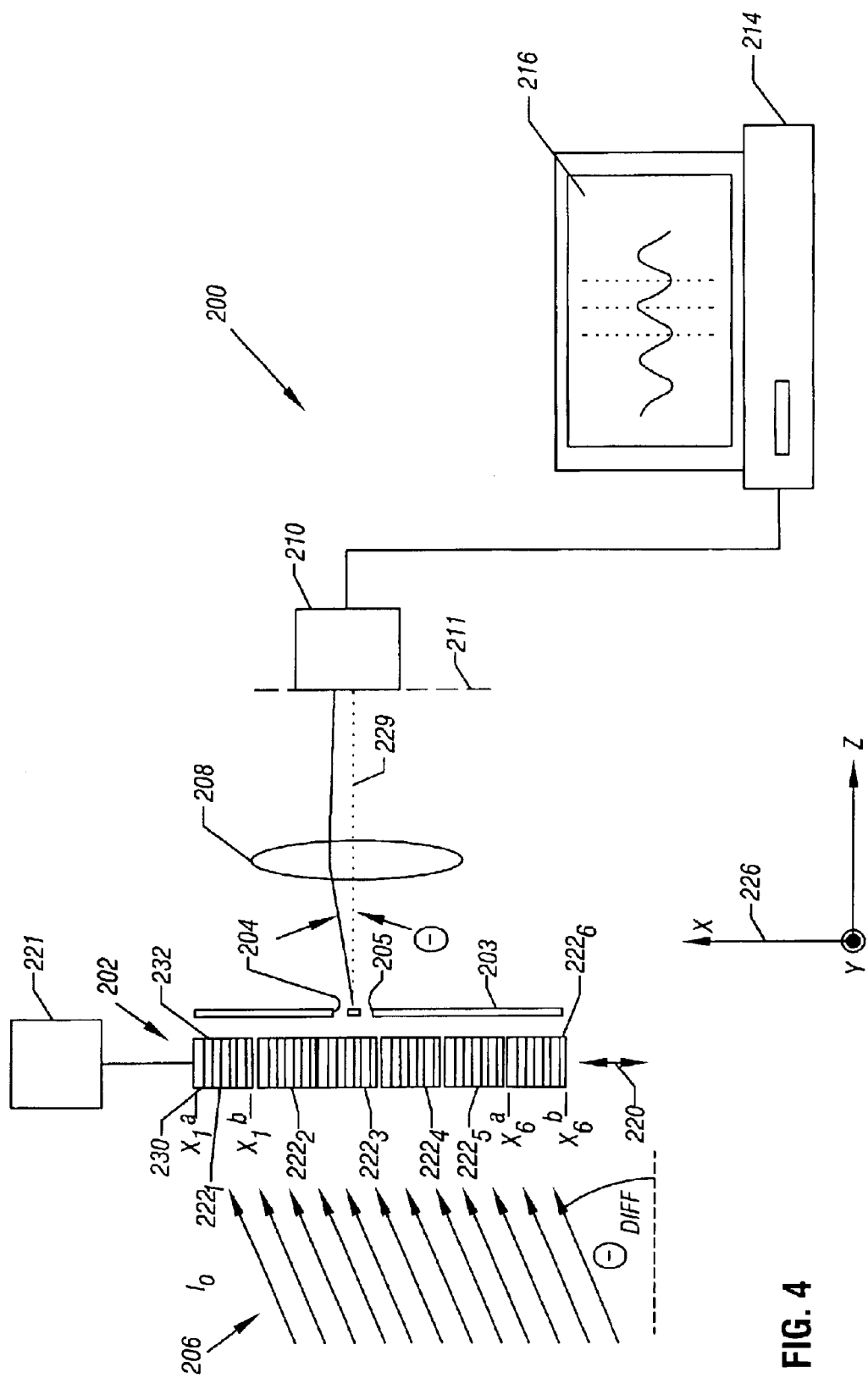
FIG. 4 is a schematic block diagram of an apparatus configured for measuring amplitude and phase contributions to an output field.

With reference to FIG. 4, an apparatus 200 configured for characterizing or measuring spatially dependent amplitude and phase contributions to an optical field incident to an optical element 202, such as a diffraction grating or phase mask. The apparatus 200 may be used to quantify the phase error so that the error may then be corrected as already described. The apparatus 200 may include an aperture plate 203 that defines slits 204, 205. In one embodiment, a well collimated optical source 206, such as a laser beam from a 1 mW frequency stabilized He—Ne laser (not shown) at a wavelength $\lambda$=633 nm, is expanded, collimated, and directed incident to normal to the element 202. A lens 208 is situated to receive optical radiation from slits 204, 205 and direct the radiation to a detector array 210 placed at a focal plane 211 of the lens 208. In an example, the slits 204, 205 are situated approximately 5 mm behind the element 202 and the lens 208 is a plano-convex lens having a 1 m focal length. The lens 208 is situated to direct a first order diffracted beam to the detector array 210. In a particular embodiment, the detector array 210 is a HAMAMATSU S3903-256Q diode array that includes 256 detector elements having a pixel size of 25 $\mu$m by 500 $\mu$m. The diode array is controlled using a HAMAMATSU 4070 driver amplifier board.

An electronic signal corresponding to the radiation distribution at the detector array 210 is communicated to a data processor 214 that is configured to store and analyze radiation distribution data. A display unit 215 may also be used. In a particular embodiment, the data processor 214 includes a National Instruments AT-MIO-16XE10 data acquisition board and a computer. In one embodiment, data acquisition, analysis, and data manipulation are performed with NATIONAL INSTRUMENTS LABVIEW software using a LABVIEW program that may be configured to determine the phase, period, and amplitude of the sinusoidal intensity pattern and the relative phase shifts of the pattern acquired by grating translation. The program and/or data can be stored on a hard disk or provided on a floppy disk or CD-ROM or other computer readable media.

The laser beam 206 (approximately a plane wave optical field) of intensity $I_0$ is directed to the element 202. The element 202 is situated on a translation stage 221 and translated with respect to the slits 204, 205 along an axis 220 in one embodiment. The element 202 may include 6 contiguous segments $222_i$, for i=1, . . . 6 spanning respective intervals $x_i^b - x_i^a$ in one embodiment. The structure of the element 202 may be periodic along an x-axis 226.

The slits 204, 205 may be situated near a front surface 230 or a back surface 232 of the element 202. The optical field produced by the slits 204, 205 and the element 202 is recorded as a far-field intensity pattern at the detector array 210 while the segmented grating 202 is translated relative to the slits 204, 205. The analysis of the radiation pattern received by the detector array 210 is discussed below with reference to the slits 204, 205 but it will be apparent that apertures of other shapes and configurations can be used and the analysis of such arrangements is similar to the following two slit analysis.

As shown in FIG. 4, the incident beam 206 of intensity $I_0$ is incident at an angle $\theta_{diff}$ to the element 202 so that a portion of the beam 206 that propagates through the element 202 and the slits 204, 205 is approximately perpendicular to the element 202 in one embodiment. For example, the angle $\theta_{diff}$ can correspond to a diffraction angle of an $n^{th}$ diffraction order in a diffractive example. The lens 208 and detector array 210 are configured to receive portions of the incident beam that are diffracted at an angle $\theta$ with respect to an axis 229. As shown in FIG. 2A, the beam 206 is directed to the element 202 at an angle associated with a diffraction order of the element 202, in a diffractive embodiment, so that an appreciable portion of the beam 202 exits the element 202 perpendicularly. The incident beam 206 may be configured so that, in the absence of the aperture plate 203, a diffraction order of the element 202 propagates an angle $\theta$ of about $\theta$=0 in one embodiment. In another embodiment, the apparatus is arranged such that the incident and diffracted beams form equal angles with the normal to the element. This arrangement minimizes the effect of small errors in the linearity of the translation stage on the accuracy of the phase measurement.

Using the ability to measure and correct errors in Bragg gratings allows the control of writing conditions to improve the fabrication of Bragg gratings. In some embodiments, the gratings may be corrected in real time as they are being written. For example, in some embodiments, a grating may be written by scanning a writing beam through a number of passes across the grating. After each pass, measurements may be taken that allow the subsequent pass to be modified to correct errors in previous passes. These errors may arise from the system used to write the gratings and in particular cases the errors may arise from the phase mask used in writing the gratings.

Thus, the techniques described herein may be utilized to make corrections prior to the inception of grating writing. However, some of these techniques and others may also be applied in real time to correct gratings as they are written. Using this approach, it is possible to correct errors in the fabrication where the sources of the errors and/or their magnitude may be unknown or may vary during exposure.

The techniques described herein may be applied to correcting gratings written using a single phase mask. They are also applicable to techniques that use at least two gratings to write the Bragg grating. For example, a first grating may create two diffracted writing beams which may be subsequently diffracted so as to overlap one another at the Bragg grating. The redirection of the diffracted beam may be done by a single grating using two separate sections of that grating or using two separate gratings.

Figure 5:
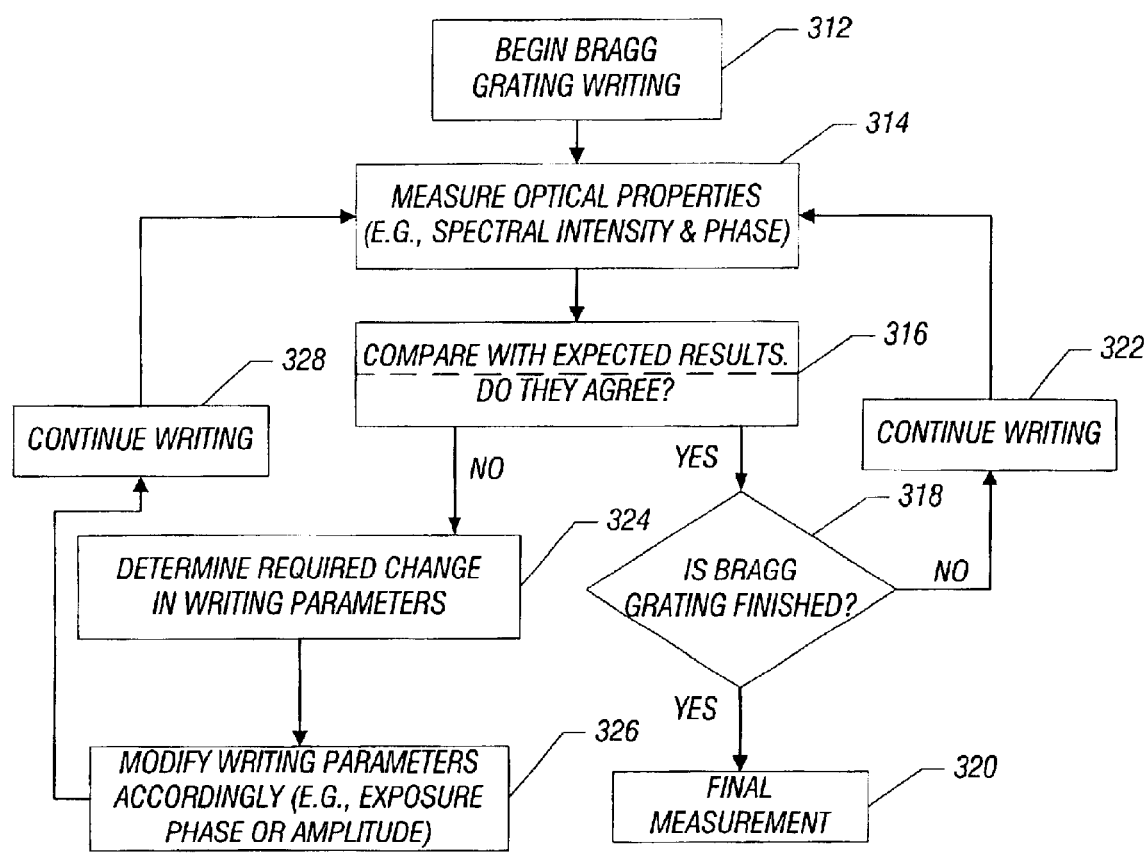
FIG. 5 is a flow chart for one embodiment of the present invention.

Referring to FIG. 5, the writing of the Bragg grating is initiated as indicated in block 312. This Bragg grating writing may involve a single scan of the grating. After the grating has been scanned once, the optical properties may be collected as indicated in block 314. Thus, the optical properties may be collected after the first scan is completed or some of these properties may be measured during the scanning of the grating. Generally, the optical properties are determined by a light beam that is passed into the grating just formed. The effect of that grating on the light beam may be measured in order to determine the nature of that Bragg grating and, particularly, whether any errors have been created in the Bragg grating.

Generally, the errors will amount to either phase errors or amplitude errors. A number of different techniques may be utilized to at least approximate the nature and magnitude of these errors. Once the nature and the magnitude of the errors are known at least approximately, corresponding changes of the same magnitude and the opposite direction may be induced to compensate for those errors. In some embodiments, the errors may also have a rate of change and the same rate of change in the opposite direction may be utilized to correct those errors.

Once the optical properties have been measured, they may be compared with expected results as indicated in block 316. If they agree with expected results, a check at diamond 318 determines whether or not the Bragg grating has been completely written. In other words, a check determines whether or not the number of scans that was intended has been completed, or whether or not the grating properties have reached their final values. If not, the writing continues as indicated in block 322. Otherwise, a final measurement is taken as indicated in block 320.

Conversely, if the results indicate that an error (e.g., chirp) has been created, the required change in writing parameters is determined as indicated in block 324. The writing parameters may be accordingly modified as indicated in block 326 and a subsequent scan may incorporate those corrections in order to remove or reduce the nature of the error. The writing process continues as indicated in block 328, iterating through another scan.

The manner of making the corrections depends on the nature of the error. For phase corrections, movement of the phase mask relative to the substrate or waveguide being written as the writing beam is scanned across the waveguide can be utilized to inject phase corrections of the same magnitude, at the same rate, and the opposite direction of the phase errors. In the case of amplitude errors, rapid oscillatory motion between the phase mask and the waveguide (i.e., dithering) can be used to control the amplitude of the Bragg grating by effectively washing out or partially erasing the fringe pattern recorded by the waveguide. For amplitude control using dithering, the speed of the dither must be faster than the scanning of the writing beam in order to wash out the fringes. Increasing the magnitude of the dither will reduce the Bragg grating amplitude. Generally, it is desirable to use the minimum dither (close to zero) to achieve the maximum Bragg grating amplitude. In this case, amplitude corrections that require increased amplitude may not be possible if they occur in locations where the dithering magnitude is already small. If amplitude errors are indicated that require increased grating amplitude in order to correct, then a dither bias may be applied throughout the grating writing process. In this way, the dither magnitude may be either increased or decreased in order to compensate for the measured amplitude error. In general however, a dither bias should be avoided unless absolutely necessary since this approach can limit the quality of the resulting Bragg grating, especially in cases where high reflectivity is desired.

Phase errors generally shift the interference pattern created by the phase mask in one direction or in the opposite direction. Correction implements the opposite shift of the same magnitude as the erroneous phase shift. Therefore any method that serves to produce the appropriate shift of the interference pattern may be used for phase correction.

A number of different measurements may be taken in real time to assess the nature, magnitude, and direction of the corrections that need to be implemented. Generally, the light may be passed to the gratings being written in the waveguide and what gets reflected out may be examined to determine the reflected spectrum. In particular, the spectral intensity of the reflected light may be measured. While phase errors cannot be determined specifically, this reflected spectral intensity provides information that can be useful in deriving the nature of the errors.

The group delay or dispersion may also be measured by injecting light into the grating during the writing process. The group delay or dispersion is a relative time delay for each spectral component or wavelength, relative to other components, that comes back out of the grating being written. Group delay, which is related to spectral phase, may be measured by any one of several methods known in the art. Alternatively, spectral phase (phase versus optical frequency) may be measured more directly using interferometric methods such as spectral interferometry where the light reflected by the grating is interfered with a stable reference signal of the same wavelength. The phase of the resulting interference fringes versus wavelength is related to the spectral phase of the grating. In many cases, it is desirable to have constant group delay or zero group delay dispersion. In other words, it is desired that all the colors or all the wavelengths come back out of the grating at the same time. For some applications, however, the grating design includes a specific, non-zero dispersion function. Dispersion compensation and optical phase coding applications are two such examples.

Another measurement that can be made is temporal impulse response. A temporal impulse response is also related to phase, but is the complement of the spectral or frequency domain information represented by group delay. The temporal impulse response also gives information that relates to amplitude. A short pulse may be sent into the grating being written and what comes out may be measured versus time. This information, in conjunction with the measured spectrum, may give a good approximation of phase using iterative algorithms.

In some embodiments, relative motion may be applied to a phase mask or grating relative to the grating being written. For example, a linear phase ramp may be utilized during a scan. A linear phase ramp involves a linear variation of a writing grating or phase mask position relative to the Bragg grating with position of the writing beam on the Bragg grating. In the absence of errors, this process results in the Bragg grating period changing linearly with grating position. This results in a linear chirp on the Bragg grating. If, however, there is a phase error source in the writing process that also imposes a chirp on the Bragg grating, this process may be used to compensate for these errors. That is, by using an appropriate direction, rate, and magnitude of movement between the grating being written and the gratings utilized for writing, the chirp may be reduced or eliminated. In other embodiments, the phase ramping may match the actual nature of the chirp, be it linear or non-linear.

The optical phase may be measured versus wavelength or time. Techniques may be utilized to directly measure phase and this information may be utilized to make appropriate corrections during scanning or between scans.

Another parameter that may be measured in order to implement corrections is polarization dependent wavelength. Because it is generally not feasible to control the polarization of light that is ultimately utilized with the Bragg gratings, polarization dependence results. Polarization dependence is where the Bragg grating produces different outputs depending on the polarization of the input light. It is more desirable that the grating, after being written, gives results that are the same regardless of polarization. This is because the input light that may be applied to the Bragg grating in the real world may have a variety of different polarizations and it is too expensive to control the polarization of that light. Polarization dependence is particularly an issue with planar waveguides.

The measurements described above may be done but they may be repeated for a variety of different polarizations to develop an understanding of the polarization dependence of each parameter. This information may be utilized for phase and/or amplitude corrections.

In some embodiments, the polarization of the writing beam may be changed to reduce the polarization dependence of the ultimate Bragg grating. In addition, exposure of the grating to ultraviolet light may induce birefringence. Stress creates birefringence, which results in polarization dependence. Through the control of the magnitude and sign of the birefringence, it is possible to introduce a desired amount of birefringence that compensates for birefringence that is inherent in the waveguide or has inadvertently been induced in writing a waveguide Bragg grating. As a result, the polarization dependence may be reduced.

Phase corrections may generally be implemented by changing the position of fringes on a phase mask relative to the corresponding position of fringes on the waveguide. If you change the position of the phase mask relative to the waveguide relatively quickly, in a process called dithering, fringes may be washed out. Dithering is an oscillatory (e.g., sinusoidal) movement of the interference pattern relative to the waveguide, back and forth, that is fast enough to reduce the amplitude of the interference pattern. The amplitude is reduced because multiple overlapping interference patterns are being written, resulting in an effective washing out of the fringe pattern. Thus, through dithering, reduced amplitude may be generated in subsequent scans that reduces or corrects amplitude excursions in previous scans. Dithering may be advantageous in some embodiments because it causes a constant change in the average refractive index ($n_0$) across the Bragg grating. This is particularly important in fabricating apodized gratings. Variations in the mean index of refraction may cause problems in terms of distortion in the spectrum.

However, in some situations, amplitude and/or phase may be corrected by modifying the intensity of the writing beam. This may involve adjustment of the power and/or duration of the writing beam. For example, if there is a variation in diffraction efficiency across a writing grating, or phase mask, then this could lead to amplitude and/or phase errors by causing a variation in exposure during writing. By controlling the laser power, one may compensate for this effect.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   measuring a temporal impulse response of a grating being written in a waveguide; and
   using information about the temporal pulse response to make a correction in the Bragg grating during the writing of the Bragg grating.

2. The method of claim 1 including scanning a writing beam over the grating in a number of passes and correcting for an error in a previous pass, in a subsequent pass.

3. The method of claim 1 including determining information related to the phase of the Bragg grating.

4. The method of claim 1 including determining information relating to the amplitude of the Bragg grating.

5. The method of claim 1 including exposing the Bragg grating to light and measuring characteristics of the light after interaction with the Bragg grating.

6. The method of claim 5 including extracting information about phase of the Bragg grating and using said information to correct the Bragg grating during the writing of the Bragg grating.

7. The method of claim 1 including measuring the reflected spectral intensity of the Bragg grating and using the reflected spectral intensity to determine a correction.

8. The method of claim 1 including measuring the group delay and using information about the group delay to implement a correction to the grating during the writing of the Bragg grating.

9. The method of claim 1 including correcting the Bragg grating by causing relative movement between a phase mask used to write the Bragg grating and the waveguide.

10. The method of claim 9 including providing a relative movement that generates a phase correction of the same magnitude but opposite direction as a phase error in the Bragg grating being written.

11. The method of claim 10 including providing a correction that has the same rate of change as the error in the Bragg grating.

12. The method of claim 1 including measuring polarization dependent wavelength.

13. The method of claim 12 including changing the polarization of the writing beam to reduce the polarization dependence of the Bragg grating.

14. The method of claim 13 including inducing birefringence to compensate for birefringence that has been inadvertently introduced during the writing of the waveguide.

15. The method of claim 13 including inducing birefringence to compensate for birefringence in the waveguide.

16. The method of claim 1 including using dithering to correct amplitude errors in the waveguide being written.

17. The method of claim 1 including modifying the intensity of the writing beam to correct an error in the waveguide being written.

18. A method comprising:
    providing relative movement that generates a phase correction of the same magnitude but opposite direction as a phase error in the Bragg grating being written.

19. The method of claim 18 including scanning a writing beam over the grating in a number of passes and correcting for an error in a previous pass, in a subsequent pass.

20. The method of claim 18 including determining information related to the phase of the Bragg grating.

21. The method of claim 18 including determining information relating to the amplitude of the Bragg grating.

22. The method of claim 18 including exposing the Bragg grating to light and measuring characteristics of the light after interaction with the Bragg grating.

23. The method of claim 22 including extracting information about phase of the Bragg grating and using said information to correct the Bragg grating during the writing of the Bragg grating.

24. The method of claim 18 including measuring the reflected spectral intensity of the Bragg grating and using the reflected spectral intensity to determine a correction.

25. The method of claim 18 including measuring the group delay and using information about the group delay to implement a correction to the grating during the writing of the Bragg grating.

26. The method of claim 18 including measuring the temporal impulse response and using information about the temporal impulse response to make a correction the Bragg grating during the writing of the Bragg grating.

27. The method of claim 18 including providing a correction that has the same rate of change as the error in the Bragg grating.

28. The method of claim 18 including measuring polarization dependent wavelength.

29. The method of claim 28 including changing the polarization of the writing beam to reduce the polarization dependence of the Bragg grating.

30. The method of claim 29 including inducing birefringence to compensate for birefringence that has been inadvertently introduced during the writing of the waveguide.

31. The method of claim 29 including inducing birefringence to compensate for birefringence in the waveguide.

32. The method of claim 18 including using dithering to correct amplitude errors in the waveguide being written.

33. The method of claim 18 including modifying the intensity of the writing beam to correct an error in the waveguide being written.

34. A method comprising:
    identifying an error in a Bragg grating being written in a waveguide; and
    using dithering to correct the error in the waveguide being written.

35. The method of claim 34 including scanning a writing beam over the grating in a number of passes and correcting for an error in a previous pass, in a subsequent pass.

36. The method of claim 34 including determining information related to the phase of the Bragg grating.

37. The method of claim 34 including determining information relating to the amplitude of the Bragg grating.

38. The method of claim 34 including exposing the Bragg grating to light and measuring characteristics of the light after interaction with the Bragg grating.

39. The method of claim 38 including extracting information about phase of the Bragg grating and using said information to correct the Bragg grating during the writing of the Bragg grating.

40. The method of claim 34 including measuring the reflected spectral intensity of the Bragg grating and using the reflected spectral intensity to determine a correction.

41. The method of claim 34 including measuring the group delay and using information about the group delay to implement a correction to the grating during the writing of the Bragg grating.

42. The method of claim 34 including measuring the temporal impulse response and using information about the temporal impulse response to make a correction the Bragg grating during the writing of the Bragg grating.

43. The method of claim 34 including correcting the Bragg grating by causing relative movement between a phase mask used to write the Bragg grating and the waveguide.

44. The method of claim 43 including providing a relative movement that generates a phase correction of the same magnitude but opposite direction as a phase error in the Bragg grating being written.

45. The method of claim 44 including providing a correction that has the same rate of change as the error in the Bragg grating.

46. The method of claim 34 including measuring polarization dependent wavelength.

47. The method of claim 46 including changing the polarization of the writing beam to reduce the polarization dependence of the Bragg grating.

48. The method of claim 47 including inducing birefringence to compensate for birefringence that has been inadvertently introduced during the writing of the waveguide.

49. The method of claim 47 including inducing birefringence to compensate for birefringence in the waveguide.

50. The method of claim 34 including modifying the intensity of the writing beam to correct an error in the waveguide being written.

51. A method comprising:
    measuring a polarization dependent wavelength error of a Bragg grating being written in a waveguide;
    determining the parameters of a writing beam to correct the error; and
    modifying the writing beam parameters to correct the error.

52. The method of claim 51 including changing the polarization of the writing beam to reduce the polarization dependence of the Bragg grating.

53. The method of claim 52 including inducing birefringence to compensate for birefringence that has been inadvertently introduced during the writing of the waveguide.

54. The method of claim 52 including inducing birefringence to compensate for birefringence in the waveguide.

* * * * *